United States Patent [19]
Brunner et al.

[11] Patent Number: 5,725,810
[45] Date of Patent: Mar. 10, 1998

[54] PACKING FOR A COUNTERFLOW HIGH PRESSURE COLUMN

[75] Inventors: Bernhard Brunner, Ann Arbor, Mich.; Philipp Suess, Seuzach, Switzerland

[73] Assignee: Sulzer Chemtech AG, Winterthur, Switzerland

[21] Appl. No.: 732,026

[22] Filed: Oct. 16, 1996

[30] Foreign Application Priority Data

Nov. 29, 1995 [EP] European Pat. Off. ............. 95810748

[51] Int. Cl.⁶ .................................................. B01F 3/04
[52] U.S. Cl. ............................... 261/112.2; 261/112.1
[58] Field of Search ............................. 261/112.2, 112.1

[56] References Cited

U.S. PATENT DOCUMENTS

| | | | |
|---|---|---|---|
| 2,042,127 | 5/1936 | Sayles | 261/112.1 |
| 2,986,379 | 5/1961 | Kramig, Jr. | 261/112.2 |
| 3,109,876 | 11/1963 | Moeller | 261/112.1 |
| 3,189,335 | 6/1965 | Fuller et al. | 261/112.1 |
| 3,263,977 | 8/1966 | Richard | 261/112.1 |
| 3,285,587 | 11/1966 | Huber | 261/112.2 |
| 3,466,151 | 9/1969 | Sicard et al. | 261/112.2 |
| 4,623,454 | 11/1986 | Tauscher et al. | 261/112.2 |
| 4,842,778 | 6/1989 | Chen | 261/112.2 |
| 5,486,318 | 1/1996 | McKeigue et al. | 261/112.2 |

FOREIGN PATENT DOCUMENTS

| | | |
|---|---|---|
| 0 462 048 | 12/1991 | European Pat. Off. . |
| 0 614 695 | 9/1994 | European Pat. Off. . |
| 961875 | 5/1950 | France . |
| 1 904 144 | 8/1970 | Germany . |
| 571510 | 8/1945 | United Kingdom ................ 261/112.2 |

*Primary Examiner*—Tim R. Miles
*Attorney, Agent, or Firm*—Townsend and Townsend and Crew LLP

[57] ABSTRACT

The packing for a counterflow high pressure column contains an ordered array of shaped lamella aligned parallel to the column axis. The packing comprises a bundle of strings extending in the direction of the column axis. Each string consists of a stack of packing elements, with adjacent elements belonging to different strings respectively forming a packing section perpendicular to the column axis. Each packing element is constructed in layers formed by the lamella. The layers are oriented in such a manner that gap-like or channel-like intermediate spaces between the lamella are laterally bounded by transversely lying lamella of adjacent packing elements belonging to the same packing section.

17 Claims, 5 Drawing Sheets

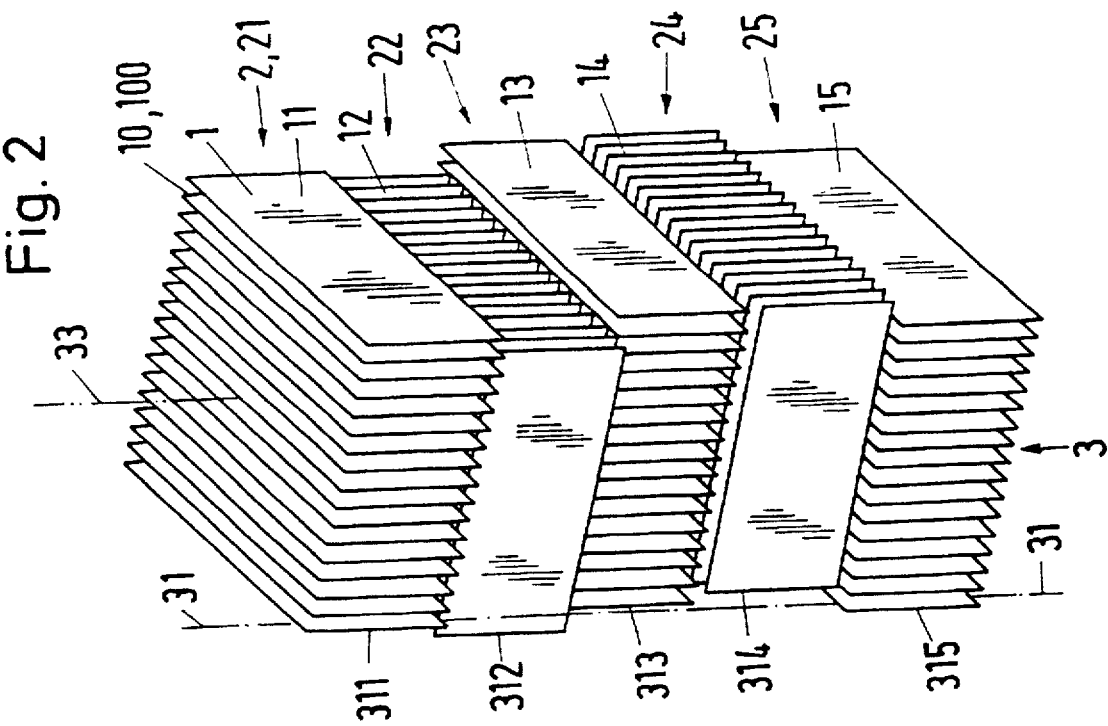
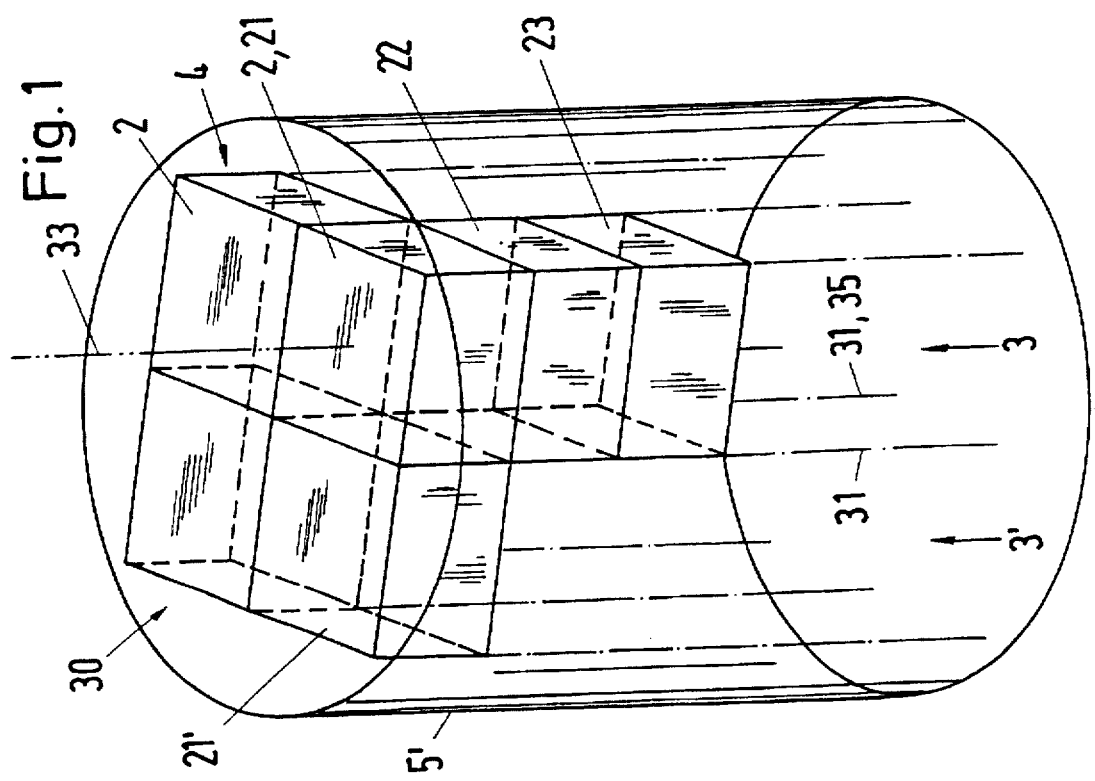

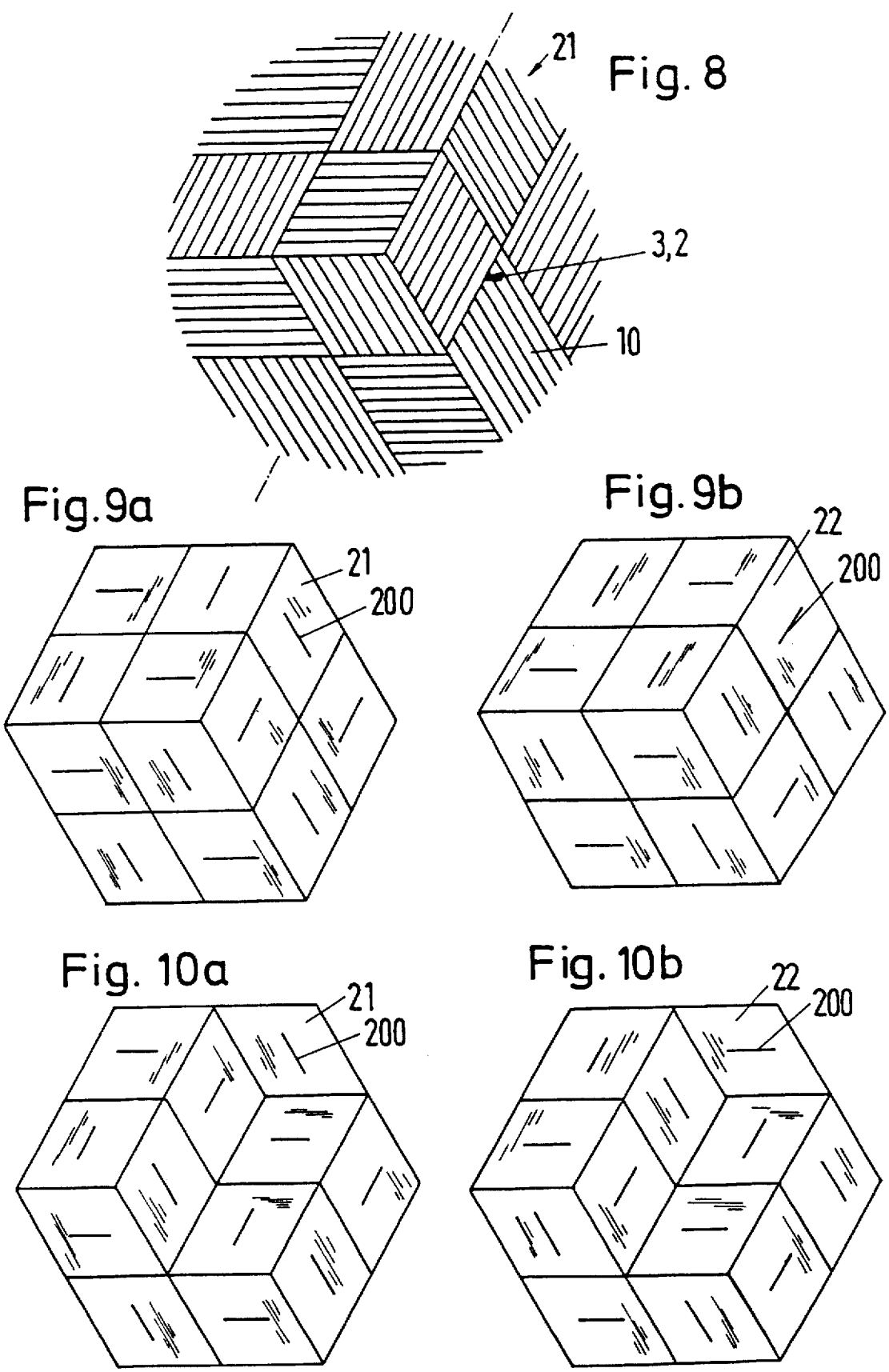

PACKING FOR A COUNTERFLOW HIGH PRESSURE COLUMN

BACKGROUND OF THE INVENTION

The invention relates to a packing for a counterflow high pressure column and high pressure columns with such packings and to the uses of such columns.

Ordered packings constructed of formed sheet metal lamella directed parallel to the column axis have proved very successful for fractionating columns at low pressures (vacuum to atmospheric pressure). Experiments have also been performed successfully at high pressures (up to 50 bars).

These experiments were performed with a pilot column having the following geometrical properties: The height of the column is 18 m and its inner diameter is 35 cm; the packing is composed of cylindrical packing bodies 20 cm in height. These bodies are made of sheet metal and each have an open crossed channel structure. Each of the bodies consists of structured, obliquely folded sheet metal lamella which are stacked one against the other in such a manner that open channels crossing one another are formed which extend at an inclination to the column axis. The packing bodies stacked one upon another are oriented in such a manner that the layers of adjacent bodies produced by the sheets are directed transverse to one another, and such that in particular the orientation changes in each case by 90°.

A gas flowing through the packing moves essentially in the form of a droplet flow. In the packing bodies the gas experiences a mixing in the direction of the layers. As a result of the alternating orientation of adjacent packing bodies, a complete mixing takes place over the entire column cross-section.

If a gas (vapor flow) and a liquid (trickle film) are allowed to pass in counterflow through the packing for the purpose of a rectification, then a thermal and material exchange between the two phases leads to a good fractionation effect if the liquid is applied uniformly over the packing cross-section by means of a distributor. A rectification can be performed successfully up to the load limit of the packing. Corresponding experiments have also been performed successfully for pressure absorption processes in pilot columns.

Experiments in high pressure columns of larger diameters, i.e. with diameters greater than about 50 cm, have failed. The reason for the failure appears to be instabilities. Since the densities of the two phases differ by at most about an order of magnitude (i.e. a power of ten) at high pressure, a substantial momentum exchange between the two fluid phases results, and consequently large shear forces are present between the two fluid flows. As a result of a low surface tension of the liquid phase and of the shear forces, the gas flow can pull liquid along with it in the form of droplets. A segregation takes place, i.e. a redistribution of the phases, in which gases with a locally increased gas flow and corresponding rivulets with a locally increased liquid flow develop. Thus neither a uniform trickle film of the liquid nor a droplet flow of the gas is any longer present. Consequently there results a massive deterioration of the fractionation effect.

SUMMARY OF THE INVENTION

The following measure may be proposed to remedy instabilities in high pressure columns: The packing is segmented into a plurality of parts, each comprising a sequence of only a few packing bodies. A gas/liquid distributor as described in European patent publication 0 462 048 is placed between succeeding packing parts. Such a distributor extends over the entire column cross-section and comprises a plurality of tubes (vapor chimneys) for conveying along the gas as well as tubelets for conveying off the liquid.

This known measure employs an apparatus of great complexity. It also requires an increase in the column height compared with columns with undivided packings. It is thus an object of the present invention to set out measures which do not involve said disadvantages.

The packing for the counterflow high pressure column with an ordered array of shaped lamella directed parallel to the column axis in accordance with the invention has the following features: The packing comprises a bundle of strings extending in the direction of the column axis. Each string consists of a stack of packing elements, with adjacent elements belonging to different strings each forming a packing section perpendicular to the column axis. Each packing element is built up of layers which are formed by the sheets. Moreover, the layers are oriented in such a manner that gap-like intermediate spaces between the lamella are laterally bounded by transversally lying lamella of neighboring packing elements belonging to the same packing section.

Columns with packings in accordance with the invention can also be used for chemical reactions. In particular, catalytic reactions can be performed in such columns with, for example, the surface of the packing being coated with catalytically active materials. The fractionating columns can be used for procedures such as rectification, absorption, and chemical reactions.

BRIEF DESCRIPTION OF THE DRAWINGS

FIG. 1 illustrates the layout of the packing in accordance with the invention,

FIG. 2 illustrates a string section with five packing elements,

FIG. 8 illustrates a cross-section through a packing with strings, which makes it possible to associate a hexagonal grid with the packing, FIGS. 9a, b are schematic representations of the structure shown in FIG. 8, FIGS. 10a, b illustrate variants of FIGS. 9a and 9b.

DESCRIPTION OF THE PREFERRED EMBODIMENTS

Figure 3:
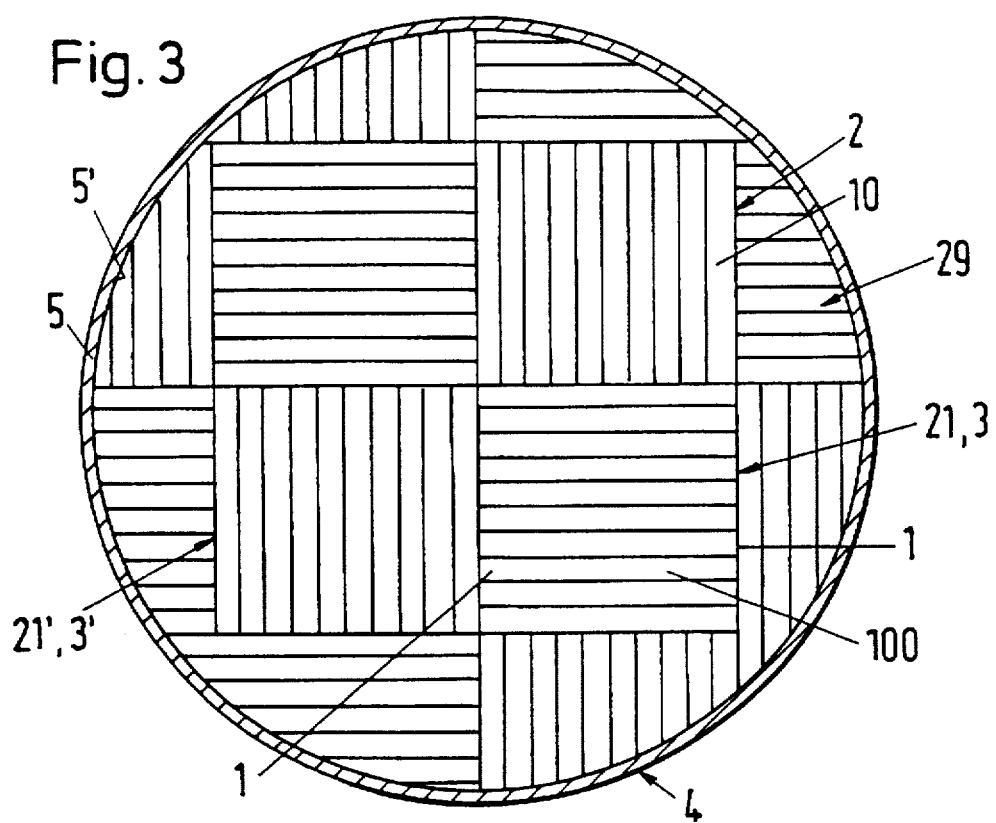
FIG. 3 illustrates a column cross-section.

FIG. 1 shows schematically a part of a packing in accordance with the invention which is built up of packing elements 2 which are arranged in a bundle 30 of strings 3, 3'. The packing elements 2 are represented simply as rectangular parallelepipeds. Each string 3, which extends along the chain dotted lines, namely the string edges 31, parallel to the column axis 35, consists of a stack of adjacent packing elements 21, 22, 23. Adjacent packing elements 21, 21' which belong to different strings 3, 3' each form a packing section 4 perpendicular to the column axis 35. The center line of the string 3 is designated by the numeral 33. The cylinder 5' represents the inner surface of a non-illustrated column wall 5 (cf. FIG. 3).

The packing elements 2 are—see FIG. 2—built up of layers 10 which are formed of sheets or lamella 1. The lamella 1 are drawn as plane surfaces for the sake of simplicity. Gap-like or channel-like intermediate spaces 100 in which fluids to be treated can flow are located between the sheets 1.

FIG. 2 shows an advantageous embodiment of the stack 3. The packing elements 21, 22, 23, 24, 25 of the stack 3 are eccentrically placed with respect to the string center line 33. The side channels 311, 312, 313, 314, 315 of the packing elements 21, 22, 23, 24, 25 are arranged helically with respect to the string edge 31. As a result of the eccentric arrangement, the side surfaces 11, 12, 13 of adjacent packing elements 21, 22, 23 are mutually offset. The reason for the special arrangement of the packing elements 2 will be explained in connection with FIGS. 5 to 7.

The column cross-section in FIG. 3 shows the arrangement of the packing elements 2 of a packing section 4 which has the form of a chessboard as a result of the alternating orientation of the layers 10. The layers 10 of a packing element 21 are oriented in such a manner that the gap-like intermediate spaces 100 are bounded at their sides by transversely disposed lamella 1 of adjacent packing elements 21'. Due to this lateral boundary the flow of the gas is in each case restricted to the individual strings 3, 3'. A non-uniform flow through the column as a result of instabilities can be prevented by the guidance of the gas through the strings.

The column cross-section is advantageously divided up by the strings 3, 3' into regions which all have at least approximately the same area. In this case the required number of strings takes on a minimum value.

The packing elements 29 at the boundaries are adapted to the rounded shape of the column wall 5. They can be made somewhat larger than shown in FIG. 3 so that they have approximately the same surface area as the packing elements 21 lying at the center.

The packing elements 2 in FIGS. 1 to 4 have substantially the form of rectangular parallelepipeds with the packing elements 29 at the column boundary 5' having a deviation from this form adapted to the rounded shape of the column cross-section. In particular the packing elements 2 have square base surfaces. They could however also be rectangular. The packing elements could also be prismatic with a parallelogram as the base surface.

Figure 4:
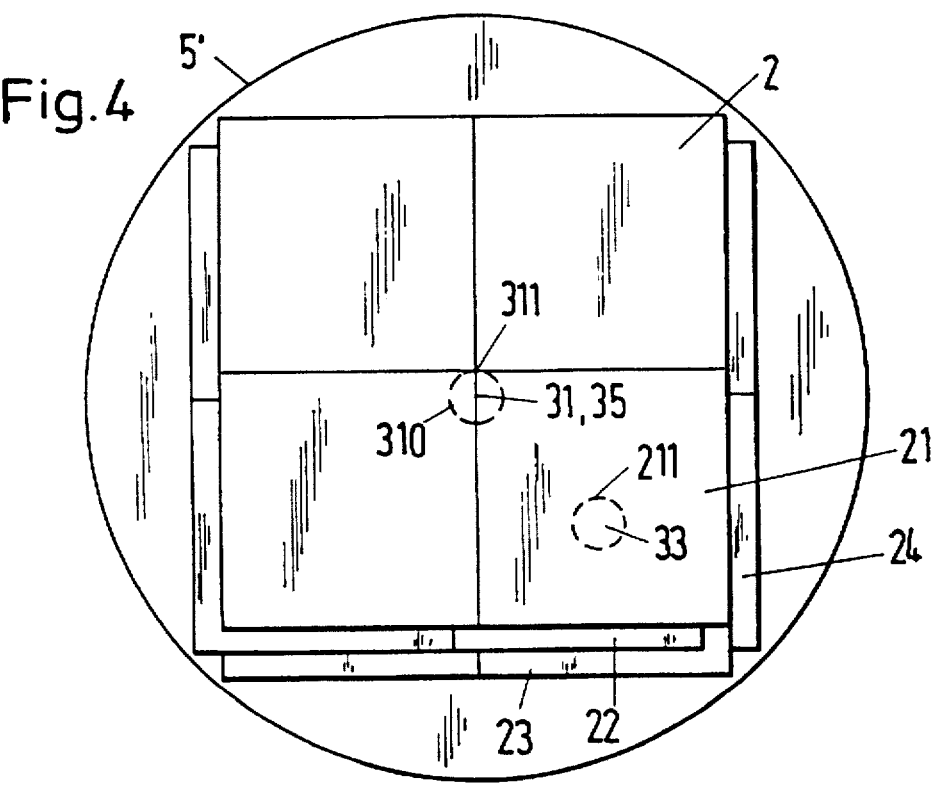
FIG. 4 illustrates a helix-type arrangement of packing elements stacked in four strings.

FIG. 4 shows a plan view of the packing elements 2 with the helical arrangement previously described with reference to FIG. 2. The side edge 311 of the packing element 21 is located on the circle 310 whose center lies on the string edge 31. The corresponding side edges of the packing elements 22, 23, 24 are located on the circular cylinder defined by the circle 310 and the string edge 31 as the axes. Similar considerations apply to the center 211 of the packing element 21 and to the centers of the packing elements 22, 23, 24 which lie eccentric to the center line 33 of the string.

The occurrence of butt points between the packing elements is associated with a known problem. The trickle film is partially deflected towards the lateral edges of the lamella as a result of the structuring of the lamella. There, rivulets of liquid form which flow along the edges. This phenomenon clearly has a negative effect on the fractionating efficiency. Measures are known from European patent publication 0 614 695 by which the appearance of edge flows of the liquid can be prevented. These measures are rather complicated. Therefore a simpler measure is provided by the present invention: the previously described eccentric arrangement of the packing elements.

Figure 5:
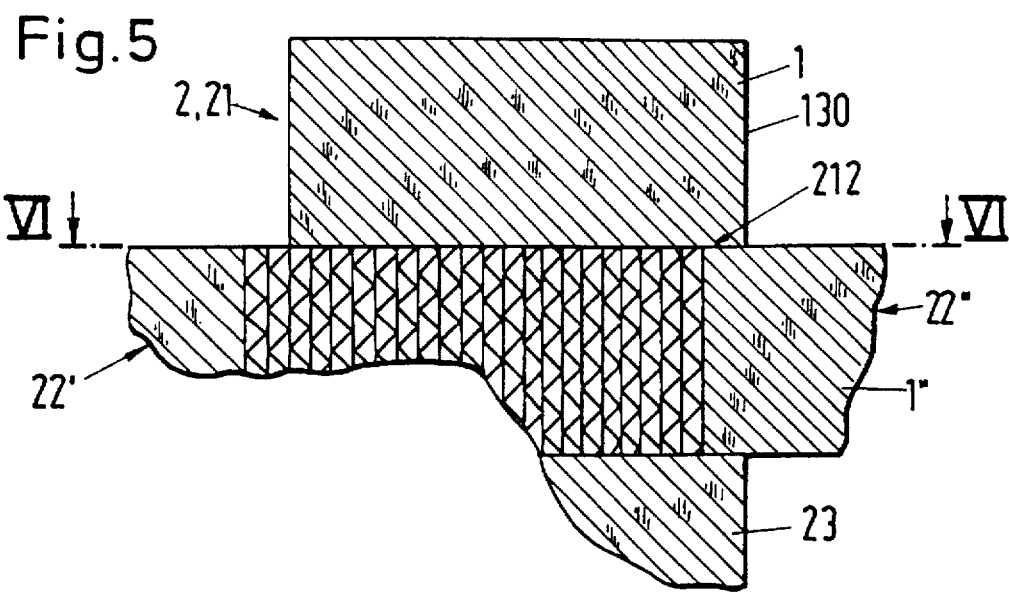
FIG. 5 illustrates a partial longitudinal section through a packing.
Figure 6:
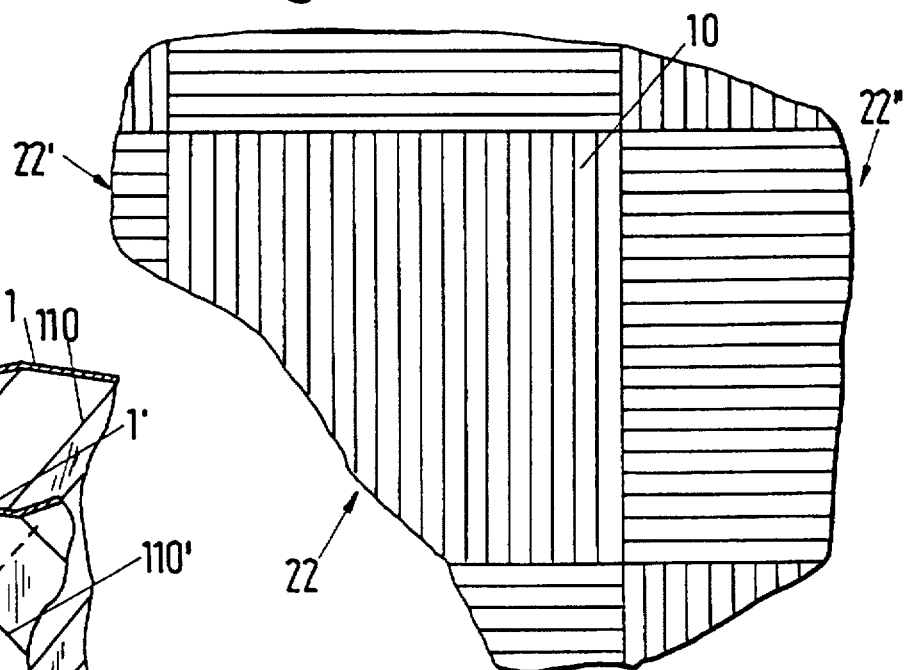
FIG. 6 illustrates a partial cross-section through the packing of FIG. 5.
Figure 7:
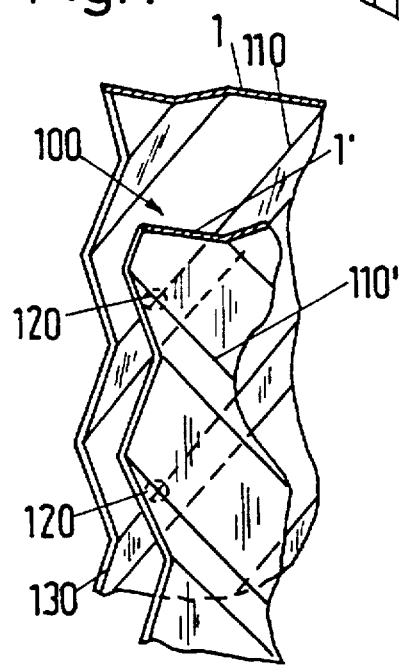
FIG. 7 illustrates parts of two neighboring lamella of a packing with an open cross channel structure.

FIG. 5 illustrates this measure in reference to the longitudinal section through a packing with an open crossed channel structure. FIG. 6 shows a cross-section of the packing along the line VI—VI in FIG. 5. Whereas the channel structure is indicated in FIG. 5, only the layers 10 are shown in FIG. 6. FIG. 7 illustrates the open crossed channel structure. There one can see parts of two adjacent lamella 1 and 1' which are folded in a zigzag pattern. The lamella 1 and 1' are in contact with each other at the crossing points 120 of the folded edges 110 and 110'. The lamella edge 130 is a place where a liquid edge rivulet forms.

Due to the eccentric arrangement of the packing elements 2, overlapping zones 212 result at their edges—see FIG. 5. Edge flow liquid of the packing element 21 which flows down the edge 130 of the sheet 1 is taken up by the sheet 1" of the lower lying packing element 22" and distributed anew. This solves the problem of the edge flow of the liquid at butt joints between the packing elements 2 of a packing section 4.

FIG. 8 shows a further embodiment of the packing in accordance with the invention. Instead of the square packing elements 2 shown in FIG. 3, the packing elements 2 in FIG. 8 are diamond shaped. The boundary areas between the strings 3 intersect the cross-sectional planes of the column at lines which form a network whose nodes lie on a hexagonal grid. In FIG. 8, one hexagonal grid is shown in the central region formed by three mutually adjacent strings 3 with six outer boundary areas connected by six nodes to form a hexagon. The geometrical structure defined by the packing element 2 of the packing section 4 is again shown schematically in FIG. 9a. The line segments 200 specify the orientation of the layers 10. FIG. 9b shows the corresponding representation of a packing section which is adjacent to section 4. The orientations 200 in FIG. 9b form a pattern inverse to the orientations 200 in FIG. 9a. FIGS. 10 and 10b show a structural variant relative to the structure of FIGS. 9a and 9b respectively.

Figure 11:
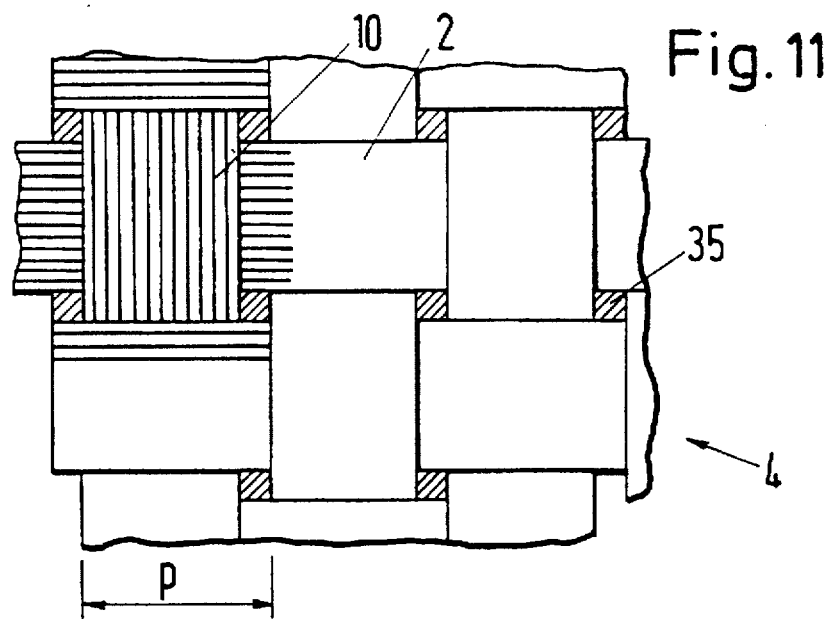
FIG. 11 illustrates a cross-section through a further packing.

In the exemplary embodiment of FIG. 11 the packing elements 2 each have a rectangular base, one side of which, here the longer side, points in the direction of the layers 10. All packing elements 2 are the same. Gaps are present between the elements 2 which can be filled out with filling bodies 35. A section adjacent to the packing section is constructed identically. By displacing the arrangement through an interval given by the arrow P one obtains the arrangement of the adjacent section.

One of the possible causes of instability of the fluid flows can also be that the vapor in the lower regions of the separation column has a higher temperature and thus a lower density than in the upper regions. If the same temperature gradient is not present in all packing strings then buoyancy forces act on the gas columns with a higher mean value of the temperature which can lead to an increase in the non-uniformities. This phenomenon can be remedied by feeding the liquid phase to the individual strings in a form regulated by a suitable liquid distributor.

Figure 12:
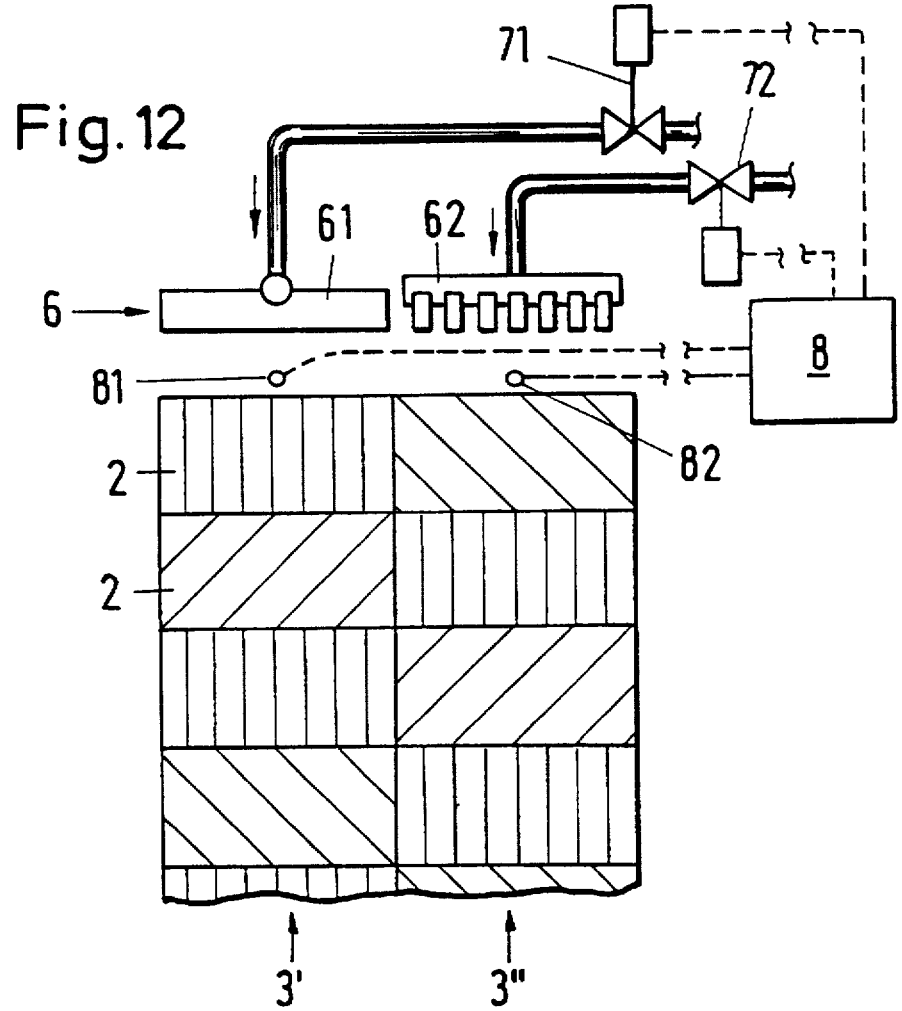
FIG. 12 illustrates a longitudinal section through installed elements of a fractionating column.

As shown in FIG. 12, the strings 3', 3" are charged with liquid by liquid distributors 61 and 62 belonging to a larger distribution apparatus 6. In a basic setting the quantities of liquid are proportional to the corresponding string cross-sections. By means of sensors 81 and 82 above the strings 3', 3" differences in temperature in the vapor flows, for example are registered by a logic circuit. The quantities of liquid fed to the distributors 61, 62 are controlled by the valves 71, 72 in response to the sensor signals. An increased vapor flow in one of the strings 3', 3" results in a higher temperature at the associated sensor 81, 82. A correction of the vapor flow can be achieved through a stronger cooling down by means of an increase in the liquid supply.

What is claimed is:

1. A packing for a counterflow high pressure column which has a column axis, the packing comprising:

a bundle of strings extending in a direction of the column axis, each of the strings including a stack of packing elements which each comprise a plurality of layers of shaped lamella, each group of adjacent packing elements from different strings of the bundle forming a packing section generally perpendicular to the column axis, the layers of shaped lamella of each packing element oriented with intermediate spaces between the shaped lamella being bounded by transversely disposed lamella of adjacent packing elements in each packing section, the stack of packing elements in each of the strings being eccentrically arranged relative to the string center line with the side surfaces of adjacent packing elements in the string being offset slightly with respect to one another.

2. The packing in accordance with claim 1, wherein the layers of adjacent packing elements in each of the strings are arranged to lie transverse to each other.

3. The packing in accordance with claim 1, wherein the side surfaces of adjacent packing elements in the string are helically offset with respect to one another.

4. The packing in accordance with claim 1, wherein the packing elements include corrugated or zigzag-folded lamella with the intermediate spaces between the shaped lamella each having an open crossed channel structure.

5. The packing in accordance with claim 1, wherein a column cross-section through the strings includes subdivided regions corresponding to the strings each having at least approximately the same surface area.

6. The packing in accordance with claim 1, wherein the packing elements each have essentially the form of a parallelepiped, with the packing elements at a curved boundary of a round column deviating from the parallelepiped to cooperate with the curved boundary.

7. The packing in accordance with claim 6, wherein the parallelepiped-like packing elements each have a square base area.

8. The packing in accordance with claim 1, wherein adjacent strings form boundary areas therebetween and the boundary areas formed by three mutually adjacent strings have outer boundary areas which intersect cross-sectional planes of the column at lines which essentially form a hexagonal grid.

9. A high pressure column for material and heat exchange or for chemical reactions which occur between a trickle film and a gaseous or vapor-like phase moving in counterflow, the column containing a packing which has a column axis, the packing comprising a bundle of strings extending in a direction of the column axis, each of the strings including a stack of packing elements which each comprise a plurality of layers of shaped lamella, each group of adjacent packing elements from different strings of the bundle forming a packing section generally perpendicular to the column axis, the layers of shaped lamella of each packing element oriented with intermediate spaces between the shaped lamella being bounded by transversely disposed lamella of adjacent packing elements in each packing section, the stack of packing elements in each of the strings being eccentrically arranged relative to the string center line with the side surfaces of adjacent packing elements in the string being offset slightly with respect to one another, wherein a liquid distributor is placed above the packing to form a largely uniform liquid distribution over the packing.

10. The high pressure column in accordance with claim 9, wherein each string in the packing can be charged with an amount of liquid corresponding to its cross-sectional area.

11. The high pressure column in accordance with claim 9, wherein each string in the packing can be charged with an adjustable amount of liquid.

12. A packing for a counterflow high pressure column which has a column axis, the packing comprising:

a bundle of strings extending in a direction of the column axis, each of the strings including a stack of packing elements which each comprise a plurality of layers of shaped lamella, each group of adjacent packing elements from different strings of the bundle forming a packing section generally perpendicular to the column axis, the layers of shaped lamella of each packing element oriented with intermediate spaces between the shaped lamella being bounded by transversely disposed lamella of adjacent packing elements in each packing section, the stack of packing elements in each of the strings being eccentrically arranged relative to the string center line with the side surfaces of adjacent packing elements in the string being helically offset with respect to one another, the layers of adjacent packing elements that are eccentrically arranged in each of the strings being arranged to lie transverse to each other.

13. The packing in accordance with claim 12, wherein the packing elements include corrugated or zigzag-folded lamella with the intermediate spaces between the shaped lamella each having an open crossed channel structure.

14. The packing in accordance with claim 12, wherein a column cross-section through the strings includes subdivided regions corresponding to the strings each having at least approximately the same surface area.

15. The packing in accordance with claim 14, wherein the parallelepiped-like packing elements each have a square base area.

16. The packing in accordance with claim 12, wherein the packing elements each have essentially the form of a parallelepiped, with the packing elements at a curved boundary of a round column deviating from the parallelepiped to cooperate with the curved boundary.

17. The packing in accordance with claim 12, wherein adjacent strings form boundary areas therebetween and the boundary areas formed by three mutually adjacent strings have outer boundary areas which intersect cross-sectional planes of the column at lines which essentially form a hexagonal grid.

* * * * *